United States Patent [19]

Martin

[11] Patent Number: 5,067,156

[45] Date of Patent: Nov. 19, 1991

[54] METHOD FOR GENERATING A RANDOM NUMBER FOR THE ENCODED TRANSMISSION OF DATA UPON EMPLOYMENT OF A VARIABLE STARTING VALUE

[75] Inventor: Guenter Martin, Neubaldham, Fed. Rep. of Germany

[73] Assignee: Siemens Aktiengesellschaft, Munich, Fed. Rep. of Germany

[21] Appl. No.: 490,433

[22] Filed: Mar. 8, 1990

[30] Foreign Application Priority Data

Mar. 8, 1989 [DE] Fed. Rep. of Germany ....... 3907526

[51] Int. Cl.$^5$ ............................................. H04L 9/00
[52] U.S. Cl. .................................. 380/46; 364/224.21
[58] Field of Search ..................... 380/46; 364/224.21

[56] References Cited

U.S. PATENT DOCUMENTS 4,786,790 11/1988 Kruse et al. .

4,890,324 12/1989 Jansen ................................... 380/46

FOREIGN PATENT DOCUMENTS

0281057A2 9/1988 European Pat. Off. .

Primary Examiner—Thomas H. Tarcza
Assistant Examiner—David Cain
Attorney, Agent, or Firm—Hill, Van Santen, Steadman & Simpson

[57] ABSTRACT

Method for generating a random number for the encoded transmission of data using a variable starting value. Using a most recently used and intermediately stored random number, every byte of this random number has a logical operation performed on it with respective bytes of a plurality of data blocks, each being n-bytes wide, from the working memory of the chip card processor and the result of this multiple operation is used as starting value for generating a new random number.

3 Claims, 1 Drawing Sheet

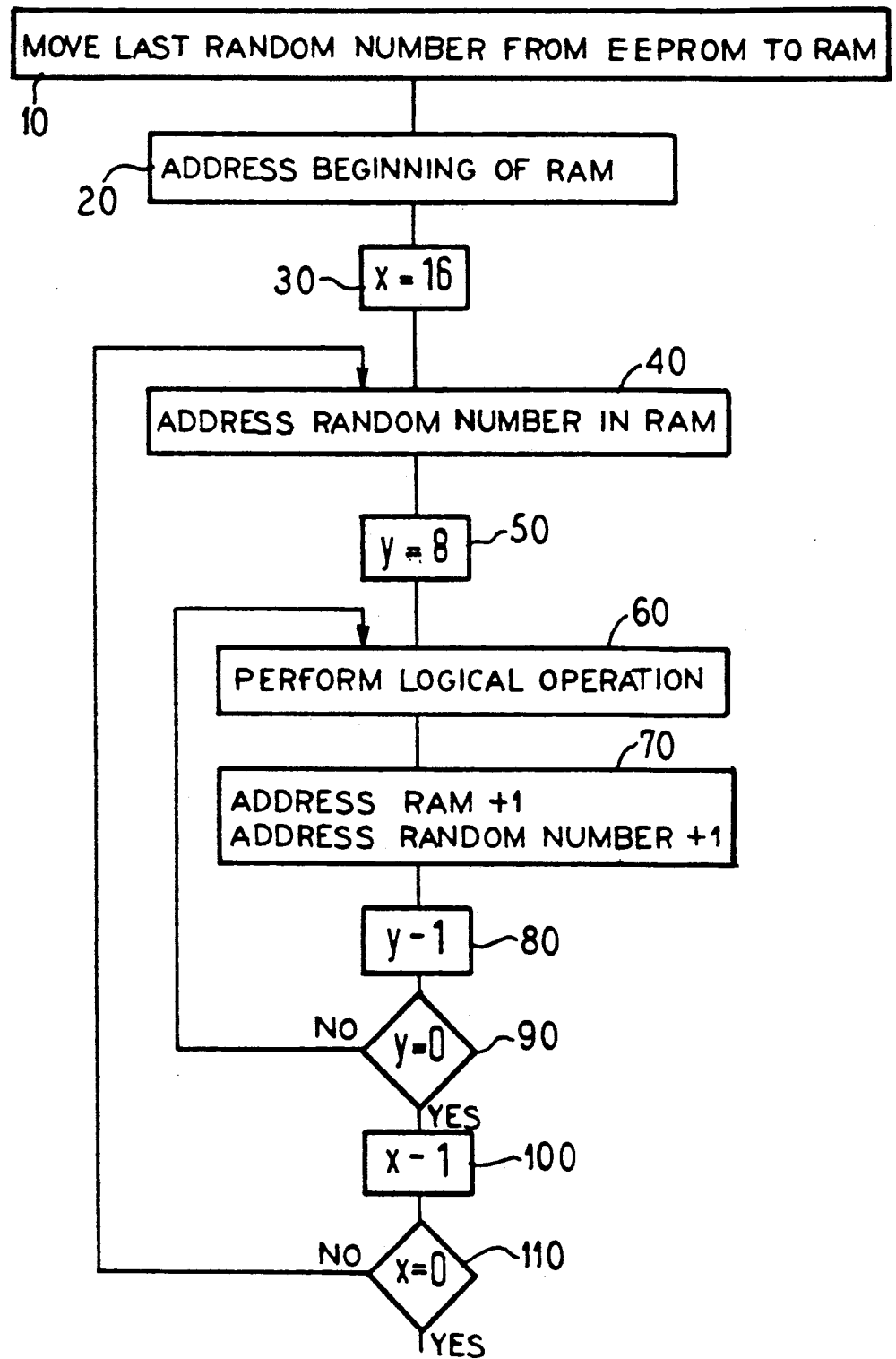

METHOD FOR GENERATING A RANDOM NUMBER FOR THE ENCODED TRANSMISSION OF DATA UPON EMPLOYMENT OF A VARIABLE STARTING VALUE

CROSS-REFERENCE TO RELATED APPLICATIONS

The present invention is related to the subject matter of U.S. Pat. No. 4,786,790 (hereby incorporated by reference) and U.S. Pat. No. 4,974,193, (hereby incorporated by reference), both of which are assigned to the same assignee as the present invention.

BACKGROUND OF THE INVENTION

The present invention is directed to a method for generating a random number for the encoded transmission of data in a data exchange system having processor chip cards, using a secret cipher, a ciphering algorithm allocated to a random number generator, and a variable starting value that is logically combined with a most recently used and intermediately stored random number.

Protection of data is an ever more important aspect regarding modern data processing and communication systems. The degree of quality of a system with respect to adequate data protection is critically dependent upon the extent to which one succeeds in providing possible access to the system only for authorized persons and, conversely, of keeping unauthorized persons locked out with absolute reliability. A simple, if not absolutely reliable possibility for checking the access authorization to a system is, for example, the use of passwords that are only known to the authorized user and that can be changed by the user with arbitrary frequency. Since there is always the risk that passwords can be discovered or overheard by unauthorized persons, additional security measures are indispensable. One of these measures, for example, is the encoding and decoding of the transmitted information, a measure that can be realized in data processing systems by using a chip card. A drawback regarding the increasing use of the chip card in communications systems, however, is the additional security risk due to the fact that chip cards can be relatively easily lost. Care must therefore be exercised to a great degree to ensure that a lost chip card is protected against potential misuse. The chip card is therefore designed such that the data stored in a protected chip card can only be accessed when an identifier stored in the chip card, for example, a personal identification number (PIN) is input in advance by the user.

A further security barrier to the system can be established by requiring an authentication of the chip card. This authentication prevents an arbitrary person or user of the system from accessing secret information in the system by pretending to be authorized. A critical prerequisite for the authentication is a personal feature of the user that cannot be copied. This feature of the user that cannot be copied is determined by using a secret cipher for the coding and decoding that is known to the two pertinent general components or partners of the system, i.e., first, the chip card and, second, the system itself. This feature is known only to these two partners. The security can be additionally enhanced by use of an arbitrary number that is transmitted by the chip card to the system, the arbitrary number being generated in the chip card upon use of the secret cipher. It would also be conceivable to produce these random numbers in a program-oriented fashion. In the opinion of security experts, however, random numbers generated in such fashion are not sufficiently random and, thus, are not ultimately reliable.

It is known that to increase the "randomness" of a random number, the generation of the random number can be made dependent on a variable starting value or, even better, this variable starting value can be modified with a random number that was previously generated.

SUMMARY OF THE INVENTION

An object of the present invention is to provide an optimally simple method that, in particular, is well-suited for use with chip cards for generating a modified starting value.

This object is inventively achieved by a method in which, every byte of the stored random number is logically combined with a respective byte of a plurality of data blocks, each respectively n-bytes wide, from a working memory of the processor. The result of this multiple operation is used as a starting value for generating a new random number. More specifically, the respective first byte of the random number is combined with the respective first byte of the individual data blocks, the respective second byte of the random number is combined with the respective second byte of the data blocks, etc.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single Figure is a flow chart depicting the method of the present invention.

DESCRIPTION OF THE PREFERRED EMBODIMENT

A prerequisite for the method of the present invention is a processor chip having an integrated random number generator whose most recently generated random number V is intermediately stored in a memory, for example, in a programmable read-only memory EEPROM. This random number V is first transferred from the programmable read-only memory EEPROM into a working memory RAM (block 10 in the Figure) that is also integrated in the processor chip and that, for example, is 128 bytes in size and divided into a total of sixteen blocks each having a size of eight bytes. Next, the start of the working memory RAM is addressed (block 20) and the first block x=16 is prepared (block 30). A double nested program loop now begins with the addressing of the first byte of the random number (block 40) in the working memory RAM such that every byte of the random number has a logical operation performed on it with a byte y from the eight-byte wide memory block (blocks 50, 60, 70, 80). When the last byte (y=0) (block 90) within a block is handled, the next block (x−1) (block 100) is addressed and a new program loop is executed within this next block until the last byte (y=0) of the last block (x=0) has the logical operation performed on it with the last byte of the random number (block 110). The result of this multiple operation yields a new starting value for generating a new random number.

The invention is not limited to the particular details of the apparatus depicted and other modifications and applications are contemplated. Certain other changes may be made in the above described apparatus without departing from the true spirit nd scope of the invention herein involved. It is intended, therefore, that the subject matter in the above depiction shall be interpreted as illustrative and not in a limiting sense.

What is claimed is:

1. Method for generating a random number for the encoded transmission of data in a data exchange system having chip cards, each having a processor, using a secret cipher, a ciphering algorithm allocated to a random number generator, and a variable starting value that is logically combined with a most recently used and intermediately stored random number, comprising the steps of: performing a logical operation on every byte of the stored random number with a respective byte of each data block of a plurality of data blocks in the working memo the processor, each data block being n-bytes wide; and using the result of this multiple operation as a starting value for generating a new random number.

2. The method according to claim 1, wherein the respective first byte of the random number is logically combined with the respective first byte of the individual data blocks, the respective second byte of the random number is logically combined with the respective second byte of the data blocks, etc.

3. Method for generating a random number in a processor chip having an integrated random number generator which uses a starting value to provide a random number, a programmable read-only memory EEPROM with at least a stored most recently generated random number, and a working memory RAM divided into a plurality of blocks, each block having a plurality of bytes, comprising the steps of:

transferring the stored most recently generated random number from the EEPROM to a first set of blocks in the RAM;

successively performing a logical operation between each byte of the blocks in the first set of blocks and at least each byte of blocks in a second set of blocks in the RAM; and providing the result of the logical operation as a new starting value for generating a new random number in the random number generator.

* * * * *